United States Patent [19]

Appel et al.

[11] 4,396,834
[45] Aug. 2, 1983

[54] DUAL REFLECTOR ILLUMINATION SYSTEM

[75] Inventors: James J. Appel, Ontario, N.Y.; Philip L. Chen, Rancho Palos Verdes, Calif.

[73] Assignee: Xerox Corporation, Stamford, Conn.

[21] Appl. No.: 249,058

[22] Filed: Mar. 30, 1981

[51] Int. Cl.³ .......................... G03B 27/54; G03B 3/14
[52] U.S. Cl. ..................................... 250/216; 350/299; 350/67; 350/346
[58] Field of Search ..................... 250/216, 578; 355/8, 355/11, 51, 65–67; 362/297, 346, 347, 349; 358/293; 350/292, 294, 299

[56] References Cited

U.S. PATENT DOCUMENTS

| Re. 29,017 | 10/1976 | Hildenbrandt | 240/41.35 R |
|---|---|---|---|
| 3,532,424 | 10/1970 | Miles | 355/51 |
| 3,844,653 | 10/1974 | Kelly | 355/8 |
| 3,977,784 | 8/1976 | Hara | 355/67 |
| 3,982,116 | 9/1976 | Sakuma | 240/1.3 |
| 4,092,066 | 5/1978 | Kawai | 355/51 X |
| 4,112,469 | 9/1978 | Paranjpe et al. | 358/293 X |
| 4,118,119 | 10/1978 | Maiorano | 355/11 |
| 4,190,355 | 2/1980 | Avery et al. | 355/71 |
| 4,288,690 | 9/1981 | Sanner | 250/216 |
| 4,295,186 | 10/1981 | Sugiura et al. | 355/67 X |

Primary Examiner—David C. Nelms
Assistant Examiner—Edward P. Westin

[57] ABSTRACT

The illumination of a document moving through an exposure zone is maximized by placing a pair of reflectors on each side of the exposure zone in close proximity to the object plane and in an optimum reflecting position in relation to the illumination source. In a first embodiment, utilized in a continuous velocity transport (CVT) system, the reflectors comprise an integral member consisting of a plurality of connected facets. In a second embodiment, wherein the document is moved across a fixed platen, the reflectors effectively consist of two elements including a physically separated extended portion which is formed within the cross section of the platen.

16 Claims, 4 Drawing Figures

DUAL REFLECTOR ILLUMINATION SYSTEM

BACKGROUND AND PRIOR ART STATEMENT

This invention relates to a document illumination system and more particularly to a pair of reflector elements placed on opposite sides of an optical slit so as to direct illumination towards an object point.

Prior art illumination system for line-by-line scanning of a document have provided a plurality of lamp and reflector combinations. The simplest arrangement consists of an elongated lamp located so as to direct the light emanating through an aperture onto a scan strip. The addition of reflectors either behind, or partially enveloping the lamp to increase illumination of the scanning area is also well known.

Various prior art systems have added further refinements such as introducing a second lamp/reflector combination to the other sides of a scan strip. A typical such system is disclosed in U.S. Pat. No. 3,844,653. Alternate versions omit the second lamp but maintain various reflector arrangements on the side of the exposure zone opposite the lamp, e.g. U.S. Pat. No. 3,982,116 and U.S. Pat. No. Re. 29,017.

There are many applications where it is most desirable to obtain a narrow intense illumination band at the illumination plane so as to obtain a narrow well defined exposure at the image plane. Typical of said systems are those wherein documents are imaged onto photosensor arrays or those wherein a linear lens array such as a gradient index SELFOC lens is utilized as the imaging means. Some of the above described illumination arrangements have been utilized in these systems but an optimum arrangement would include an apertured lamp on one side of the scan strip and a reflector on the opposite side of the exposure zone, the reflector configured and positioned relative to the illumination source so as to maximize illumination at the scan area of an object plane. Two low cost, efficient, illumination systems having these characteristics are disclosed in U.S. Pat. Nos. 4,118,119 and 4,190,355, both assigned to the same assignee as the present invention. With both of these systems, however, there still exists the further potential for increasing illumination efficiency by capturing an additional component of the light emanating from the illumination source aperture.

According to the present invention, an apertured light source is located adjacent an object plane to be scanned, a first reflector is located on the opposite side of the scan strip and a second reflector is placed on the same side of the exposure zone as the illumination source and between the source and the object plane. These reflectors effectively capture all of the solid angle of light subtended from the illumination source. In a first embodiment, the reflectors are of the facetted type and are arranged in a platenless continuous velocity transit (CVT) system. In a second embodiment, the reflectors are used in an arrangement wherein the document to be copied is supported on a platen and the two reflectors are modified to effectively extend into the cross-sectional area of the platen.

DESCRIPTION

Figure 1:
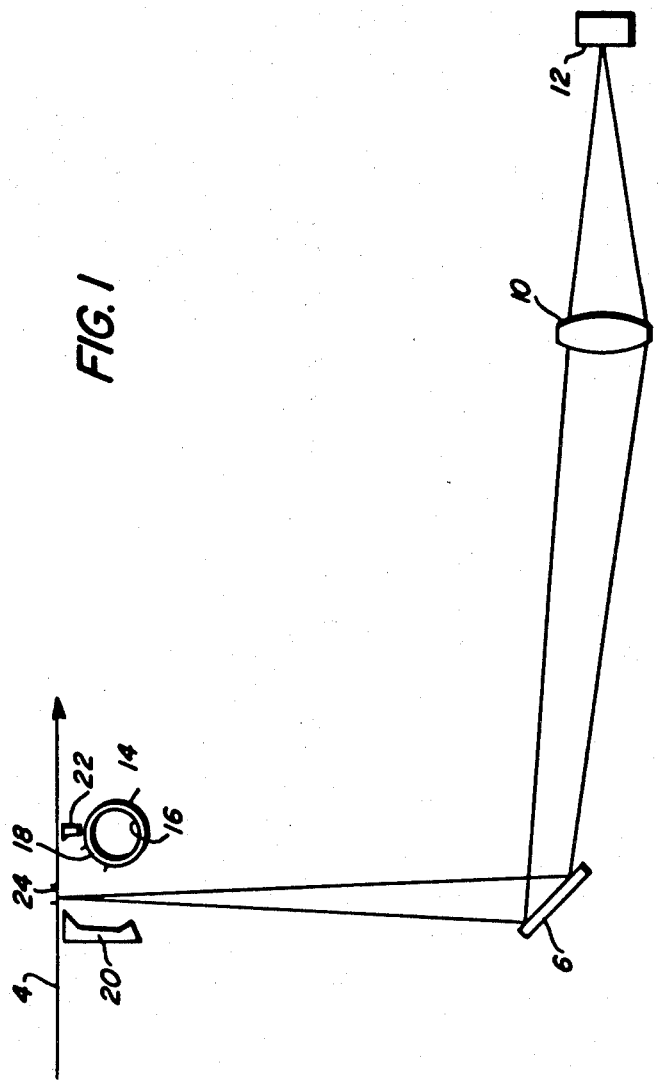
FIG. 1 is a schematic optical diagram of a scanning illumination system wherein a document is scanned in an object plane.

FIG. 1 illustrates a first embodiment of the invention wherein a novel illumination system, indicated generally as 2 illuminates a document 4, moving in an object plane in the indicated direction. This system is commonly referred to as a continuous velocity transport (CVT) system and the absence of a platen permits the close positioning of illumination source and reflectors to the document as described below. An image of each incrementally scanned line is reflected at mirror 6, and projected by lens 10 onto CCD photosensor array 12 located in an imaging plane. The illumination system 2 comprises a linear lamp 14 which can be a fluorescent lamp with a reflective coating 16 on the lamp envelope. The coating is omitted from a portion of the envelope so that a clear longitudinal aperture 18 of approximately 45° is formed. A pair of facetted reflectors 20, 22 are located on either side of exposure zone 24 and serve to optimally direct illumination from lamp 16 into narrow longitudinal exposure zone 24 in a manner discussed in greater detail below. It should be appreciated that elements 14, 20, 22 are shown in end view and that their lengths extend perpendicular to the plane of the page thereby incrementally illuminating lines of information on the document as it passes through the exposure zone.

Figure 2:
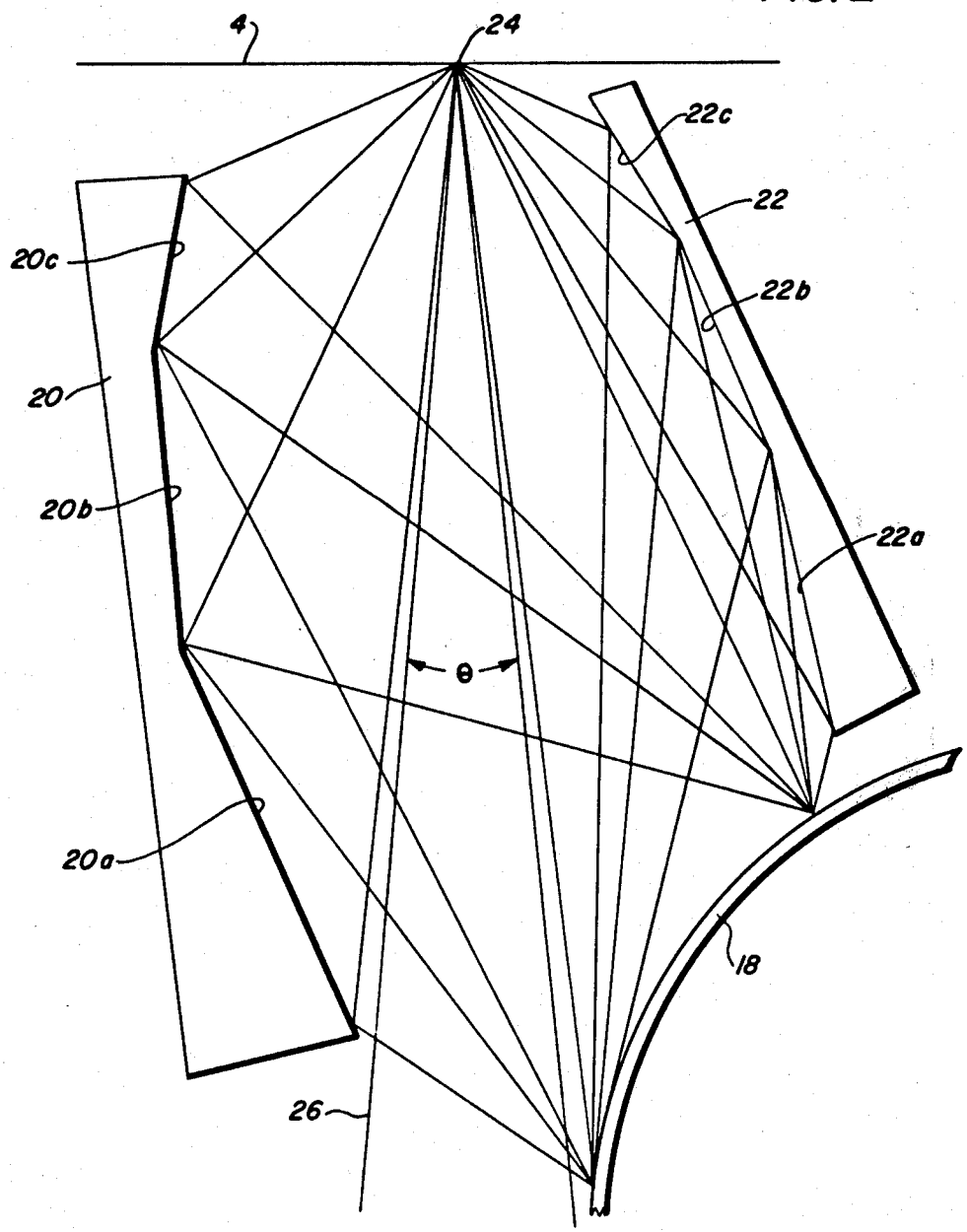
FIG. 2 is a magnified view of the two reflectors shown in FIG. 1 illustrating the effect of the two reflectors on the imaging cone.

In operation, document 4 is moved through exposure zone 24. Each incremental line of the document is successively illuminated by a narrow pencil of light generated by illumination system 2. As shown in more detail in FIG. 2, reflectors 20 and 22 each comprise a rigidly connected set of plane mirrors (facets) 20a, 20b, 20c, 22a, 22b, 22c. The reflectors 2 may be constructed as described in the aforementioned U.S. Pat. No. 4,190,355, whose contents are hereby incorporated by reference. Each facet 20a, 20b, 20c of reflector 20 is set at an angle and is of such a length that the entire aperture 18 of lamp 14 is visible from exposure strip 24. A similar procedure is followed for reflector 22. From FIG. 2, with the two reflectors in the indicated position, an observer at zone 24 would see multiple images filling the entire semicircle below the exposure slit except for the area of imaging cone 26, represented by angle θ. The light reflected from the illuminated strip is directed along optical path, the light bundles being contained within cone 26. Mirror 6 is positioned relative to exposure strip 24 so as to reflect a linear image of each scanned line into lens 10. This image is focused by lens 16 onto array 12. As known in the art, the photosensor elements comprising the array produce an electrical signal representative of the irradiance of the portion of the image incident thereon. These electrical signals, when combined, form an electrical representative of the scanned line. These signals can then be stored and/or transmitted to remote locations and utilized as desired.

The above described system is thus seen to maximize the illumination from the relatively low radiance fluorescent source. In the absence of any reflectors, the radiometric efficiency of the scanner would be extremely poor. If a first reflector 20 is added, the gain is increased by about 1.9x, the gain being defined as the ratio of the irradiance at the exposure slit produced by the lamp and reflector, to the irradiance at the exposure slit produced by a lamp only, of the same diameter, at the same distance from the exposure slit and at the lamps optimum aperture orientation angle and aperture size. With the addition of reflector 22, the gain increases to 2.6. Because of the symmetrical arrangement of the two reflectors, there is also a good light "balance" in the left/right input. This balance helps to minimize paste up shadows.

While the facetted reflectors shown in FIG. 1 may be preferred for some systems, other reflector configurations may be used for one or both reflectors. For example, either or both reflectors may have a curved surface. The reflectors would still be positioned relative to the aperture so that their surfaces capture the light escaping the light source aperture.

Figure 3:
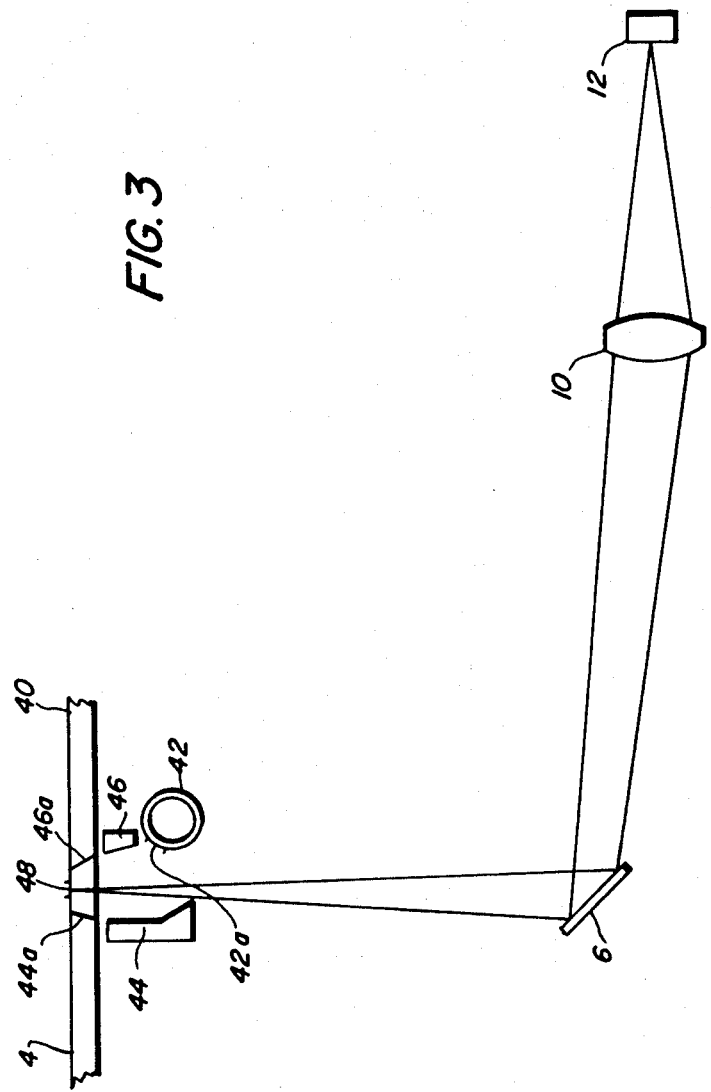
FIG. 3 is a schematic optical diagram of a scanning illumination system wherein the document is placed on a platen.
Figure 4:
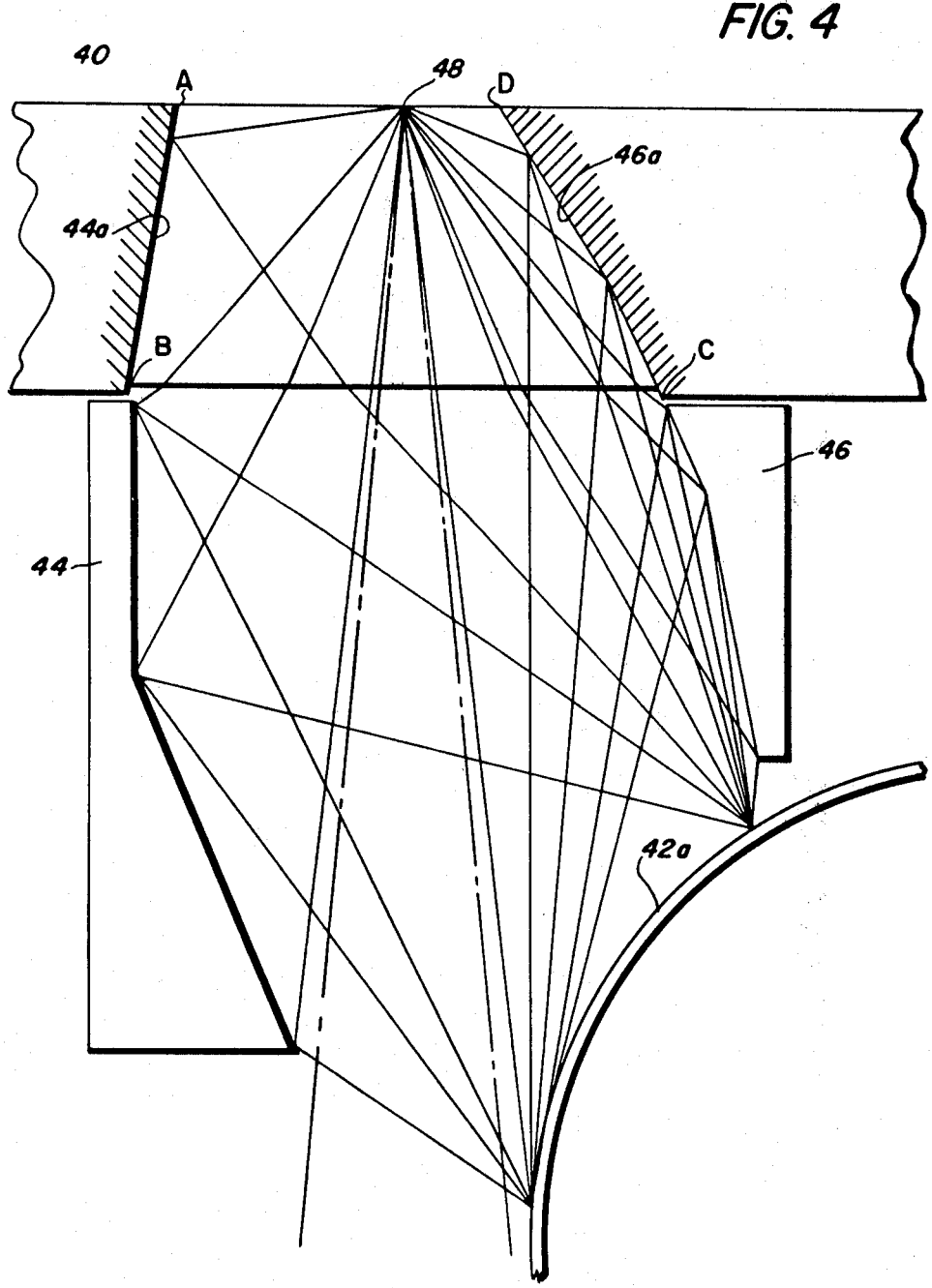
FIG. 4 is a magnified view of the two reflectors shown in FIG. 3 illustrating the effective extension of the two reflector ends into the platen.

Referring now to FIG. 3, the present invention is shown modified for use in a system wherein document 4 is moved across the surface of a platen 40. As in the system shown in FIG. 1, a fluorescent lamp 42, in conjunction with facetted reflectors 44, 46, direct light towards exposure zone 48. Since the platen has a finite thickness, however, the reflectors are separated from the documents by the thickness of the platen, typically $\frac{1}{4}$ to $\frac{1}{2}$ inch. This arrangement, although acceptable for some systems, would result in somewhat less radiometric efficiency of the CCD array since some light from the lamp would be let through the areas of the platen above and to the sides of the reflector. However, and as shown in greater detail in FIG. 4, reflectors 44, 46 have been effectively extended by inserting additional reflective elements 44a, 46a into the body of the platen. These elements, in a preferred embodiment, form a trapezoidal cross-section ABCD and are so arranged that each point along the surface is totally internally reflecting light from lamp onto the exposure strip. Although in a preferred embodiment, the elements 44a, 46a are flat, they can also be curved, as can portion BC of the platen. These curved embodiments add additional power to the configuration and increase efficiency even further. Also, for a simpler system, one of the elements 44a, 46a may be omitted thereby incurring some loss of efficiency. For some systems, the economical tradeoff may be acceptable.

The presence of a platen in the FIG. 3 embodiment imposes tighter constraints on the size of reflector 46 than its counterpart in the FIG. 1 arrangement. For certain applications, reflector 46 may be eliminated and reflector 46a relied upon to maximize illumination.

Although the embodiments of FIGS. 1 and 3 show images being projected onto a CCD array, other imaging surfaces may be used. For example, the reflected images may be projected onto a photoreceptor in either drum or belt form as is known in the art. Another exemplary application of the disclosed illumination system is in conjunction with the use of a linear lens such as a SELFOC lens array comprising a plurality of gradient index optical fibers. The operations of these lens arrays in a copier environment require an intense narrow band illumination of the document to be copied and the disclosed lamp/reflectors provide this type of illumination.

In conclusion, it may be seen that there has been disclosed an improved illumination system. The exemplary embodiment described herein is presently preferred, however, it is contemplated that further variations and modifications within the purview of those skilled in the art can be made herein. The following claims are intended to cover all such variations and modifications as fall within the spirit and scope of the invention.

What is claimed is:

1. An illumination system for incrementally illuminating a document moving across an exposure zone in an object plane, comprising
    a linear light source disposed beneath and on one side of said exposure zone said light source having an aperture defined through a portion thereof,
    a first reflector located on the opposite side of said exposure zone with its reflective surface facing said light source aperture so as to reflect illumination from said light source towards said exposure zone, and
    a second reflector located between the light source and the object plane and on the same side of the exposure zone as said light source and having its reflective surface facing said light source so as to reflect all illumination received from said light source aperture towards said exposure zone, whereby said reflectors effectively capture all of the solid angle of light subtended from said illumination source.

2. The illumination system of claim 1 wherein said reflectors each comprise a plurality of plane mirror facets.

3. The illumination system of claim 1 wherein said reflectors each comprise a single curved surface.

4. The illumination system of claim 1 wherein one of said reflectors has a curved surface and the other has a facetted surface.

5. The illumination system of claim 1 said system further including means for transmitting light reflected from incrementally illuminated portions of said document onto an imaging plane.

6. The illumination system of claim 5 wherein said reflected light is focused by a lens element onto a photosensor array.

7. The illumination system of claim 1 further including a platen in said object plane, said document moving over the surface of said platen, at least one of said first and second reflectors comprising two reflector segments, one segment comprising a reflector located beneath said platen and the second segment a reflector extension embedded within the body of said platen.

8. The illumination system of claim 7 wherein both reflectors comprise two reflector segments, one segment of each extending into and embedded in said platen, and wherein the two platen surfaces defined therebetween said embedded reflector segments assume a trapezoidal configuration.

9. The illumination system of claim 7 wherein said first reflector comprises said two reflector segments and said second reflector is wholly contained within the body of said platen.

10. The illumination system of claim 7 wherein said second segments embedded within said platen are curved so as to focus incident rays thereon onto said exposure zone.

11. The illumination system of claim 8 wherein the bottom surface of said platen enclosed between said second elements is curved so as to supplement focusing power onto the exposure zone.

12. In a system for transmitting the information content of a document onto an imaging plane, the combination comprising
    means for moving the document through an object plane past an exposure zone formed therein, an illumination assembly for illuminating said exposure zone with a narrow, intense irradiance, said assembly comprising an apertured light source located beneath and on one side of the exposure zone, a first reflector element located between said light source and said object plane and on the same side of said exposure zone having its reflective surface facing said light source so as to reflect all illumination received from said light source aperture towards said exposure zone, and a second reflector element located on the opposite side of the exposure zone, said first and second reflectors located relative to said light source so as to effectively capture all of the solid angle of light subtended from said illumination source, and means for transmitting light reflected from said document moving past said exposure zone onto said imaging plane.

13. The system of claim 12 wherein said transmitting means includes a projection lens and a mirror located on the object side of said lens, and wherein a photosensor array is located in said imaging plane, said mirror reflecting an image of said scanned document line through the entrance pupil of said lens onto said array.

14. The system of claim 12 wherein said transmitting means is a linear gradient index lens array.

15. The system of claim 13 further including a platen in said object plane.

16. The system of claim 15 further including third and fourth reflector elements formed within said platen on opposite sides of said exposure zone, said elements arranged so as to totally internally reflect light impinging thereon into said exposure zone.

* * * * *